March 10, 1959 S. W. KESSLER, JR 2,876,596
GLASS SEALING
Filed Nov. 28, 1955
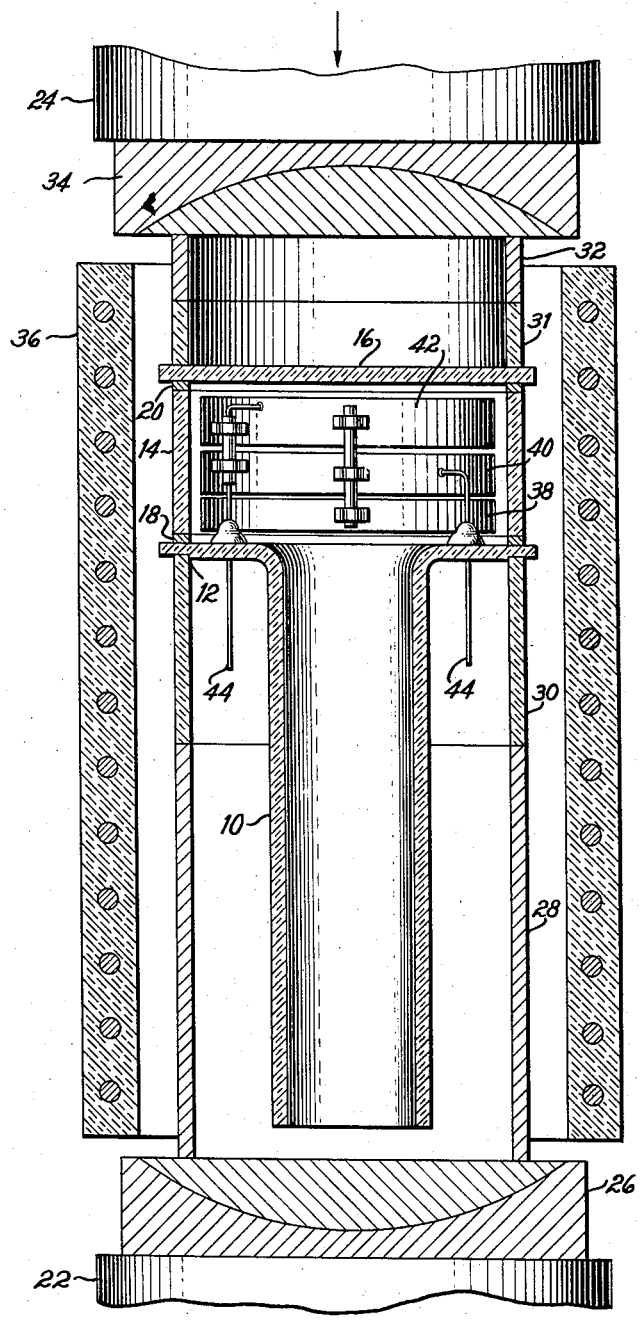
INVENTOR.
SEBASTIAN W. KESSLER, JR.
BY
William A. Zalesak
ATTORNEY United States Patent Office 2,876,596
Patented Mar. 10, 1959

2,876,596

GLASS SEALING

Sebastian W. Kessler, Jr., Baltimore, Md., assignor to Radio Corporation of America, a corporation of Delaware Application November 28, 1955, Serial No. 549,447

9 Claims. (Cl. 49—81)

This invention relates to the art of sealing glass parts to glass parts and glass parts to metal parts and particularly to the use of a metallic solder in joining glass and metal envelope portions of electron discharge devices.

In the field of electronic tube manufacture, low melting point glass solders as well as metallic solders have been used in the past to join glass to glass and glass to metal and ceramic to metal. Such solders have been used for various reasons and also to provide an envelope structure which can be evacuated and processed at elevated temperatures. Solder glasses, used to join glass and metal parts together, have softening temperatures ranging from 400° C. to 450° C. Thus, sealing temperatures of at least 515° C. and higher in the range of 550° C. to 600° C. have been used. These sealing temperatures are below the softening temperatures of the common soft glass parts which are normally used in electron discharge devices, but are well above the softening temperatures of the solder glasses used.

However, there has been an increasing need for solders which can be used to join glass envelope parts together at relatively low temperatures. It has been found that in many precision made tubes there is a loss in dimensional stability when the tube is heated to the softening temperature of the glass envelope parts. Camera pickup tubes for television utilize an optically formed faceplate, on the inner surface of which is formed the photocathode. Light, from the scene to be televised, is projected through the faceplate onto the photocathode. To preserve the accuracy of the televised picture, there is need for the tube faceplate to remain optically clear throughout tube fabrication and processing, so that the televised picture is not distorted when the tube is put into use. It is difficult to seal such faceplates to the other glass or metal envelope parts at high temperatures and avoid the introduction of distortions in the glass. As an expedient, use has been made of welding techniques in which the glass parts of the tube envelope which are to be joined are sealed directly to thin metal flanges which can be then welded together externally of the tube envelope to form the seal.

The direct sealing of glass to glass and glass to metal, of necessity, takes place at relatively high temperatures in excess of 800° C. which is well above the softening temperatures of commercial glasses. Immediately after sealing, the bulb must be annealed by heating it to temperatures above the annealing temperatures of the bulb glass (e. g. 460–470° C. for glasses such as Corning 9010 or 9012). These fabrication temperatures preclude the formation of phosphor layers and photosensitive films, for example, on the inner surface of the tube envelope prior to sealing the tube parts together. The use of low temperature sealing techniques would simplify and reduce the cost of tube fabrication by the ability to mount temperature sensitive films and electrodes within open portions of the tube envelope prior to their being sealed together. There is also an increasing use of materials in discharge tubes which break down if they are heated to the relatively high temperatures required for the softening of glass.

The use of glass solders are limited by the mismatch of the expansion coefficients of the glass solders commonly used with the expansion coefficients of the common bulb glasses. Solder glasses having low melting points inherently have greater expansion characteristics than the common soft bulb glasses used in making tube envelopes. It is also recognized that the use of metal solders to join glass to glass parts and glass to metal parts are feasible if the metal used can be adapted to the bulb fabrication techniques used. The metal solder preferably should be one which has a melting point above the temperature at which it is desired to process the tube, so that the tube can be evacuated during the bake-out cycle around 400° C. Furthermore, the vapor pressure of the constituents of the metal solder must be low enough so that they will not volitilize while the tube is being baked. The coefficients of expansion of the solder must match that of the glass parts sufficiently close so that undue strain is not introduced into the glass. Also the metallic solder must be capable of wetting the glass parts to be sealed.

It is therefore an object of this invention to provide a method of joining glass to glass and glass to metal components of electronic tube devices at temperatures below their softening point so that no optical distortion will be introduced into the glass parts.

It is another object of this invention to provide a method for sealing glass parts and metal parts together at relatively low temperatures below the softening temperatures of the glass parts.

It is another object of the invention to provide a method for sealing glass and metal parts together at relatively low temperatures below the temperatures at which the glass parts will distort either under their own weight or under the forces of external pressure.

The invention is in the use of an aluminum solder to join glass parts or glass and metal parts together at relatively low temperatures. The method makes use of external pressure applied to the parts to be soldered as a means for reducing the sealing temperature with the metallic solder. Pressures ranging up to the order of 7,000 pounds per square inch applied to the seal areas at low temperatures have provided vacuum tight seals between glass parts and metal parts with the use of an aluminum solder material between the parts.

The single figure discloses an apparatus and method of forming a seal between glass parts in accordance with the invention.

This invention is directed to the use of aluminum or an aluminum alloy as a soldering material between the glass envelope parts for an electron discharge device. The advantage of using aluminum is that aluminum in its melted state wets glass very well. Also aluminum with a melting point close to 660° C. remains stable during tube processing procedures during which the tube parts are baked around 400° C. However, the melting point of aluminum at 660° C. is above the softening points of soft glasses commonly used in bulb fabrication such as the Corning 9012 glass with a softening point of 628 C. and the Corning 9010 glass having a softening point of 650° C. To prevent the distortion of glass parts at the melting temperature of aluminum it was found, in accordance with this invention, that a successful sealing method can be followed by pressing an aluminum foil between the glass surfaces to be joined at high pressures and at temperatures lower than the melting point of aluminum and the softening point of the glass. This sealing technique which combines the use of pressure with relatively low temperatures was found to give reliable results and successful seals were consistently made. Aluminum appears to join to glass by a diffusion method in which aluminum atoms replace silicon atoms in the structure of the glass.

The figure discloses an apparatus which can be used to seal glass envelope parts together by using an aluminum solder together with the application of temperature and pressure. In the figure, tube parts are shown consisting of a tubular envelope portion 10 having a flared flange 12 at its upper end. A cylindrical glass envelope portion 14 is mounted so as to rest on the flange 12. A glass faceplate 16 is supported by the cylindrical envelope portion 14. These glass portions 10, 14 and 16 form a closed end of an envelope for a television pickup tube. Plate 16 is an optically formed plate to provide a minimum of distortion of light projected through the plate during tube operation. It is desirable in forming this type of envelope to join the faceplate 16 to the glass cylindrical portion 14 with an hermetic seal and at a temperature which would introduce no optical distortion into the plate 16. Also, it is desirable to join the cylindrical portion 16 to the flange 12 of the envelope portion 10 at a minimum temperature so as to prevent distortion of heat sensitive materials or electrodes mounted within the envelope prior to sealing.

To join the envelope portions 10, 14 and 16 together at relatively low temperatures it is proposed in accordance with this invention to use aluminum foil between the glass portions 10, 14 and 16 respectively to seal them one to another. Because of the shape of the glass parts to be sealed the aluminum foil is formed as rings 18 and 20, which are placed respectively between envelope parts 12 and 14, and 14 and 16. With this type of seal it is preferable to clean the surfaces of the aluminum foil to remove any foreign matter such as grease and even its own oxide, since the presence of foreign matter will retard the sealing reaction. The cleaning of aluminum may be done by etching the aluminum foil in a solution of from 10% to 15% nitric acid and 5 to 15% hydrofluoric acid. Other appropriate cleaning procedures are also possible. It is appreciated that it is impossible to remove all of the oxide from the aluminum surface as there is always some oxide formation on the surface of aluminum.

The tube parts are assembled between the jaws 22 and 24 of a hydraulic press. They are supported as is shown in the figure. Pressure block 26 is first placed on the lower jaw 22 of the press. Supported on this is a lower metal support cylinder 28 upon the upper end of which is coaxially mounted a lower glass support cylinder 30. The tubular envelope portion 10 is placed within these supports 28 and 30 such that the flange portion 12 rests on the lower glass support cylinder 30. The diameters of cylinders 28 and 30 are such that cylinder 30 supports flange 12 directly opposite the surface to which the envelope cylinder 14 is to be sealed. The aluminum foil ring 18 is placed on the upper surface of flange 12 and envelope cylinder 14 is placed on the foil ring 18 so that it lies entirely on the foil 18. Upon the surface of the upper end of cylinder 14 is placed the foil ring 20 so as to completely cover the surface of this end of cylinder 14. Faceplate 16 is then laid on the aluminum ring 20. Directly opposite the seal region between plate 16 and cylinder 14 is placed an upper glass support cylinder 31 and an upper metal support cylinder 32. Cylinders 31 and 32 being of the same diameter are fitted together as shown in the figure. An upper pressure block 34 is placed on the upper metal support 32 and the upper jaw 24 of the hydraulic press is brought down to contact the block 34.

Pressure blocks 26 and 34 are made as is shown of two portions having a spherical ball type joint therebetween so that the pressure is applied equally to all portions of the support cylinders. A slight pressure is applied to the parts when they are assembled to prevent them from moving. A furnace 36 is placed around the apparatus and is used to raise the assembled parts to a temperature around 400°. The support cylinders 28, 30, 31 and 32 can be of any material; it has been found that if cylinders 30 and 31 are made of glass, difficulties are not encountered as a result of the difference in the heating rates of the envelope and the supports. When the parts have been heated to this temperature the full temperature load is applied between the jaws 22 and 24 of the hydraulic press.

The load applied to the assembly should be as high as possible and should provide a pressure above the yield strength of the aluminum so that it will flow and break up any oxide present on its surface. As shown in the table, below various loads have been applied ranging from 600 pounds load to 4,000 pounds load depending upon the types of glass and the dimensions of the parts sealed. The time necessary to maintain the parts under pressure at the elevated temperature is dependent upon the reaction rate of the aluminum with the type of glass on the assembly. Like most diffusion processes, the reaction appears to occur rapidly at first and then slows down with time as the chemical concentration gradient decreases. For most seals of the type described, a period of 10 minutes has been found to be satisfactory.

While the parts are still at the sealing temperature and at the end of the required time for sealing, the pressure is slowly removed and a stress relieving cycle is started. After the parts are stress-relieved, they may be cooled to room temperature.

The stress relieving cycle, below the annealing point of the glass, is so called because it removes the stresses which are placed in the glass while it is in compression and at the sealing temperature. These stresses are a result of the glass being viscous and tending to creep while pressure is applied to it. When the pressure is released, the compressive stresses put into the glass are reversed and it immediately puts the glass in tension causing the glass to crack. Sometimes it is observed that the seal will be stripped and the glass cracked if the pressure is released too rapidly as a result of these tensile stresses.

The temperature, pressure and time combination necessary to make an aluminum pressure seal of the type described is dependent on the properties of the aluminum, the type of glass and the care exercised in preparing the surfaces for the seal. If all of these factors are not fully considered together, successful hermetic seals are difficult to make.

The temperature at which a seal is made must be high enough to give sufficient mobility to the atoms at the interface between the glass and the aluminum. For the aluminum, this should be above its recrystallization temperature. For the glass, it is dependent on its chemical composition and chemical activity. For glasses considered as being soft, such as the Corning 012 or 008 glasses, the sealing temperature is lower than for hard glasses, such as Corning 7052, 7056 and L650 glasses. In general, it has been found best to make a seal at or slightly above the strain point of the glass. Of course, it is preferable not to heat the glass above its annealing temperature with the high pressures used or excessive creep will occur at such a rapid rate that dimensional stability is lost.

The pressure used in making aluminum seals must be high enough to assure intimate contact between the glass and aluminum in all areas of the seal. Therefore, it is necessary to have joining surfaces as flat as possible. For seals made with tubing of a small diameter (1 to ½") it has been found the load per unit area which the glass can support without breaking is greater than large diameter tubing (3"). As a result of this, it has been possible to make seals with small diameter tubing with surfaces prepared on a silicon carbide cut-off wheel, but for the larger tubing, it is necessary to take the same precautions to keep the surfaces flat as are practiced in preparing metallographic samples.

In the table below are listed combinations of loads in pounds, temperature and time which have been found successful for different types of glass.

Table

| Type of Glass | Dia., inches | Load in pounds | Temperature, degrees | Time, mins. | Wall Thickness, mils |
|---|---|---|---|---|---|
| Corning No. 012 | 1-½ | 1,100-2,200 | 450 | 5-10 | 100 |
| Corning No. 008 | 1 | 1,100-2,200 | 430-500 | 2-10 | 70 |
| Corning No. 7052 | 1 | 600 | 450 | 5-10 | 53 |
| Corning No. 7052 | 3 | 4,000 | 450-470 | 10-15 | 90 |
| Corning No. L650 | 3 | 4,000 | 510 | 10 | 90 |

In the table above, the total load used to form the seal in a particular case is given in pounds. Due to the dimensions of the glass surfaces being sealed together, the actual pressure in pounds per square inch is considerably more. For example, in the 1" diameter glass seal formed with Corning #7052 glass with a load of 600 lbs., the actual pressure per sq. inch is in the order of 2,000 lbs. In a similar manner, the last two items in which seals were made with the Corning #7052 glass and the Corning L650 glass with glass parts having 3-inch diameters and a 90 mil wall thickness, the actual pressure per sq. inch is in the order of 2,400 lbs. However, successful glass seals can be made with pressures ranging up to the order of 7,000 lbs. per sq. inch applied to the seal areas.

The thickness of the aluminum foil, which is used in making the aluminum seal, is not critical. A range of thicknesses from .001" to .016" thick have been used. For the smaller seals, .005" thickness has produced satisfactory seals while for the larger seal .010" thick material has produced the best results. If the aluminum is too thin, it is difficult to obtain a vacuum tight seal because of uneven pressure on the foil resulting from slight variations in glass. If the aluminum foil is too thick, it flows out of the seal region without any advantage.

Glass-to-metal seals can be made by the same method. It is important to keep oxide formation on the metal parts to a minimum. This can be accomplished by having an initial pressure on the parts to prevent air circulating over the sealing surface while they are heated. Vacuum tight seals can be obtained between SAE 1010 steel and Corning No. 012 glass. It is found that small particles of dust on the bearing area could cause a crack to start and, therefore, it is necessary to wash the parts thoroughly so that they are free from all foreign particles. Also, in order to prevent cracking of the glass cylinder, it is helpful if a slight temper is put into the glass beforehand. Other methods of reducing the chance of a crack to form are putting a slight bevel on all edges and etching the ground surfaces.

The use of an aluminum foil as a solder between glass parts and between glass and metal parts has proved to be satisfactory due to the inherent characteristics of the aluminum metal. Since the melting point of aluminum is around 660° C., a tube, having an envelope sealed together in the manner above, can be exposed to exhaust and bake-out encountered in tube fabrication which are above 400° C.; that is, at this temperature a vacuum can be pulled during the bake-out cycle. Furthermore, the vapor pressure of the aluminum is sufficiently low that the metal does not voltilize at these bake-out temperatures.

Aluminum has a coefficient of expansion 2 to 4 times greater than the types of glasses to which it is sealed. It would appear that this would make it impossible to develop as a solder. However, it was found that as long as the aluminum is ductile, it is able to absorb most of the strain at the seal. Thus, it is necessary to keep the aluminum as free from impurities as possible and to use the minimum amount of alloying elements so that the aluminum remains soft enough to absorb the strain because of the difference in the coefficient of expansion. If too great an amount of alloying elements is added to the aluminum, the aluminum becomes hard and is not able to keep the strain in the glass below the critical value and the seal will be stripped.

It has been found that it is easier to make the aluminum metal adhere to lead glass or lime glass than a hard glass such as Pyrex. However, by alloying aluminum with misch metal the formation of the seal between the aluminum and the glass is much easier. Misch metal is an alloy of rare earth metals containing about 50% cerium with 50% lanthanum, neodymium and similar elements. The aluminum alloy used to make the type of seal described above, was aluminum with 4% misch metal by weight.

The novel method of sealing parts together described above is one in which the temperature of the seal is maintained below the softening temperature of the glass parts. Thus precision made parts such as the optically clear faceplate 16 is kept free of any distortion to the glass plate which would be introduced by using higher sealing temperatures. Furthermore, electrode structures 38, 40 and 42, for example, shown in Figure 1 may be mounted upon the flange portion 12 prior to the joining of the enclosing cylinder portion 14 to the flange 12. Mounting means may be provided by lead in structures 44 sealed through the flange 12 and which are welded or otherwise joined to any of the electrodes 38, 40 and 42. This mounting of electrodes can be done easily and without complicated tools and procedures prior to the sealing of the cylindrical portions 14 to the flange 12. The relatively low temperature used in making the seal between cylinder 14 and flange 12 is in no way detrimental to the electrode structures 38, 40 and 42 mounted therein.

The pressure used in the formation of the seal described is that which has been set forth as being applied by a pneumatic press. Any other form of application of the pressure may be utilized. Furthermore, the actual pressure applied to the upper and lower support cylinders may be reduced by evacuating the envelope parts simultaneously with the application of the pressure so that the total pressure used to form the seal is a combination of that supplied by the press and atmospheric pressure on the tube faceplate 16.

What is claimed is:

1. The method of forming a hermetic seal between a plurality of closely fitted parts, said parts including a glass element, said method comprising the steps of, fitting machine portions of said parts together with a thin continuous foil of aluminum between a portion of said glass element and a matching portion of another one of said parts, heating said fitted parts to an elevated temperature below the melting point of aluminum and the softening point of said glass element, pressing said fitted parts together to form said seal while at said elevated temperature and with a pressure on said fitted portions between 3000 and 7000 pounds per square inch.

2. The method of forming a tube envelope having a plurality of closely fitted parts including a glass element, said method comprising the steps of, fitting matching portions of said parts together with an aluminum alloy metal foil between a portion of said glass element and a matching portion of another one of said parts to form an envelope, heating said fitted envelope parts to an elevated temperature below the annealing point of said glass element, pressing said fitted parts together with a pressure between 2000 and 7000 pounds per square inch, holding said envelope at said elevated temperature for a period of time in the order of ten minutes, pressing said fitted portions together by pressure and while said envelope is at the elevated temperature to form a hermetic seal between said envelope parts.

3. The invention of claim 2 in which said another one of said fitted parts is metal.

4. The invention of claim 2 in which said another one of said fitted parts is glass.

5. The invention of claim 2 in which said metal foil comprises aluminum alloyed with misch metal.

6. The method of forming a tube envelope including a pair of closely fitted glass parts having matching portions, said method comprising the steps of, fitting said envelope parts together with a continuous thin aluminum-misch metal foil between said matching portions of said glass parts, heating said fitted glass parts to an elevated temperature between the strain point and the softening point of said glass envelope parts, pressing said fitted parts together while at said elevated temperature with a pressure from 2000 lbs. per sq. inch to 7000 pounds per square inch to form a hermetic seal therebetween.

7. The invention of claim 6 wherein said elevated temperature of sealing is below the melting point of said aluminum alloy.

8. The method of forming a tube envelope including a plurality of fitted parts of glass having matching portions, said method comprising the steps of, fitting said envelope parts together to form said envelope with a continuous thin aluminum alloy foil between said matching portions of said glass parts, heating said fitted parts to an elevated temperature between the strain point and the annealing point of said glass envelope parts and below the melting point of said alloy, pressing said fitted parts together while at said elevated temperature with a pressure from 2000 lbs. per sq. inch to 7000 pounds per square inch, maintaining said fitted parts at said elevated temperature and at said pressure for a period of time between 2 and 10 minutes to form a hermetic seal between said fitted parts, slowly removing said pressure while said fitted parts are retained at the elevated temperature, and cooling said parts to ambient temperature.

9. The method of forming a tube envelope including a plurality of glass parts having matching surfaces, said method comprising the steps of fitting said glass parts together to form said envelope with a continuous thin foil of an alloy of aluminum and misch metal between said matching surfaces of said glass parts, heating said fitted parts to an elevated temperature between the strain point and the softening point of said glass envelope parts and below the melting point of said alloy foil, forcing said fitted parts together with a pressure between 2000 lbs. per sq. inch and 7000 pounds per square inch to form a hermetic seal therebetween, maintaining said envelope at said elevated temperature and pressure for a period of time of about ten minutes, without substantial cooling slowly removing said pressure from said fitted parts, and subsequently cooling said envelope to ambient temperature.

References Cited in the file of this patent

UNITED STATES PATENTS

| | | |
|---|---|---|
| 1,724,645 | Engels | Aug. 13, 1929 |
| 2,110,900 | Zimmermann et al. | Mar. 15, 1938 |

OTHER REFERENCES

Ser. No. 414,756, Long (A. P. C.), published Apr. 27, 1943.

UNITED STATES PATENT OFFICE

CERTIFICATE OF CORRECTION

Patent No. 2,876,596                                                       March 10, 1959

Sebastian W. Kessler, Jr.

It is hereby certified that error appears in the printed specification of the above numbered patent requiring correction and that the said Letters Patent should read as corrected below.

Column 2, line 61, for "628 C." read -- 628° C. --; column 6, line 59, for "3000 and 7000 pounds" read -- 2000 and 7000 pounds --.

Signed and sealed this 21st day of July 1959.

(SEAL)
Attest:

KARL H. AXLINE                                                      ROBERT C. WATSON

Attesting Officer                                              Commissioner of Patents